May 8, 1962
C. E. BRANICK
3,032,818
METHOD OF AND APPARATUS FOR FORMING WRAPPERS
FOR ARTICLES OF ANNULAR SHAPE
Filed Feb. 18, 1960
3 Sheets-Sheet 3
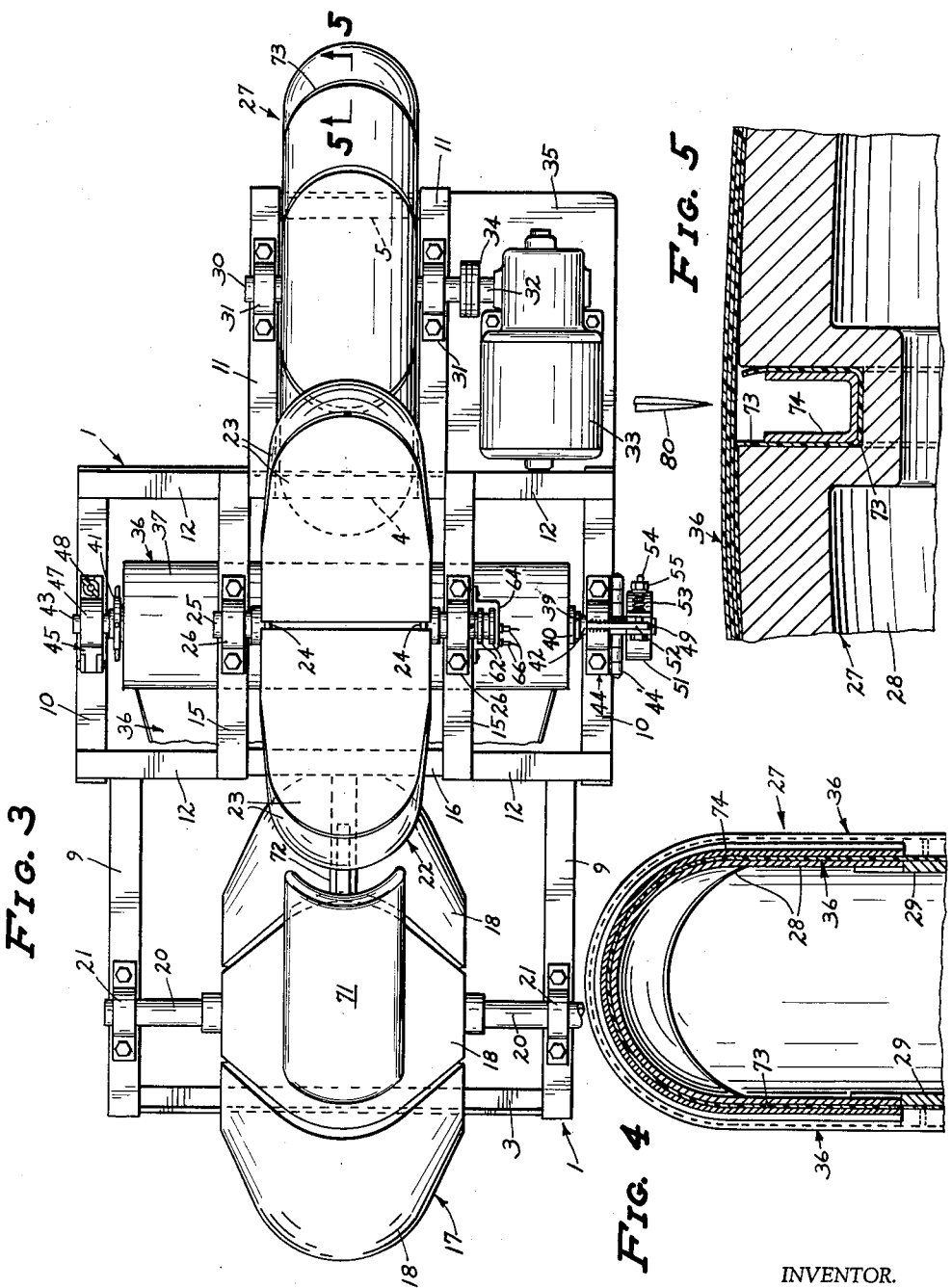
INVENTOR.
CHARLES E. BRANICK
BY
Merchant & Merchant
ATTORNEYS

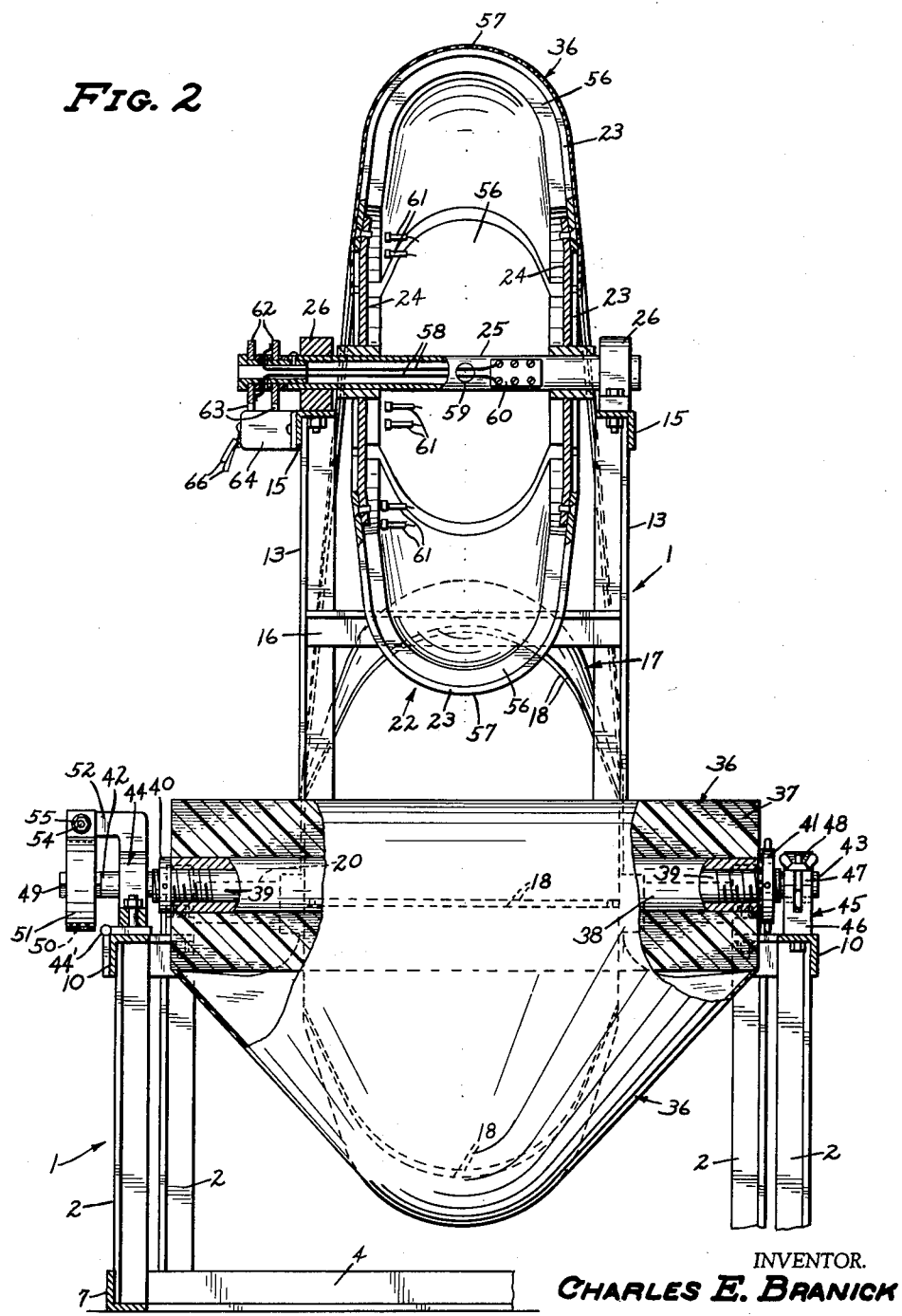

United States Patent Office 3,032,818
Patented May 8, 1962

3,032,818
METHOD OF AND APPARATUS FOR FORMING WRAPPERS FOR ARTICLES OF ANNULAR SHAPE
Charles E. Branick, % Branick Manufacturing Co., P.O. Box 1937, Fargo, N. Dak.
Filed Feb. 18, 1960, Ser. No. 9,525
5 Claims. (Cl. 18—19)

My invention relates generally to the forming of flat thermoplastic synthetic sheet material into desired shapes, and more particularly to the producing of formed wrappers from flat sheet stock, for use in wrapping annular articles, such as automotive vehicle tires and the like.

Heretofore in the wrapping of tires, to protect the finish of the same during transportation and storage, it has been customary to wind a length of tape, made from paper or the like, around the tire, each winding of the tape passing through the central wheel receiving opening of the tire. This method of wrapping a tire requires the use of costly machines and is time-consuming.

An important object of my invention is the provision of a novel method of producing a tire wrapper which requires but a minimum of time and effort in being applied to a tire.

Another object of my invention is the provision of a method of producing a tire wrapper from thermoplastic synthetic flat sheet material, which results in a formed convering having a smooth surface that conforms substantially to the contour of a tire when placed thereon.

Another object of my invention is the provision of a method as set forth, whereby a substantial number of wrappers may be automatically formed and disposed in concentric nested relationship for compact storage and easy handling.

Briefly stated, my novel method consists of heating and elongating a flat rectangular sheet of thermoplastic synthetic material adjacent the longitudinal axis thereof and relative to the opposite longitudinal edges thereof, and forming the sheet into cross sectionally U-shape, whereby the sheet assumes the form of a radially inwardly opening longitudinally arcuate channel, and thereafter cooling the formed sheet to set the form thus assumed.

Another object of my invention is the provision of novel apparatus for producing tire wrappers by my improved method.

Another object of my invention is the provision of a rotary forming roll and a collector roll whereby an elongated sheet of wrapper material is continuously formed and wound on the collector roll in its formed state, and of means for guiding a cutting device through all of the formed and wound layers of material on the collector roll, whereby to produce a plurality of concentric nested wrappers in the form of split rings.

Still another object of my invention is the provision of a forming roll having heating means therein for softening the sheet material to a moldable state below the melting point thereof, whereby the central portions of the sheet material are heated to a higher temperature than the opposite longitudinal side edge portions thereof.

The above, and still further highly important objects and advantages of my invention will become apparent from the following detailed specification, appended claims and attached drawings.

Referring to the drawings, in which like reference characters indicate like parts throughout the several views:

FIG. 2 is an enlarged transverse sectional view taken substantially on the line 2—2 of FIG. 1;

FIG. 3 is a view in top plan;

FIG. 4 is an enlarged fragmentary detail taken substantially on the line 4—4 of FIG. 1; and FIG. 5 is a still further enlarged fragmentary detail in section taken on the line 5—5 of FIG. 3.

Figure 1:
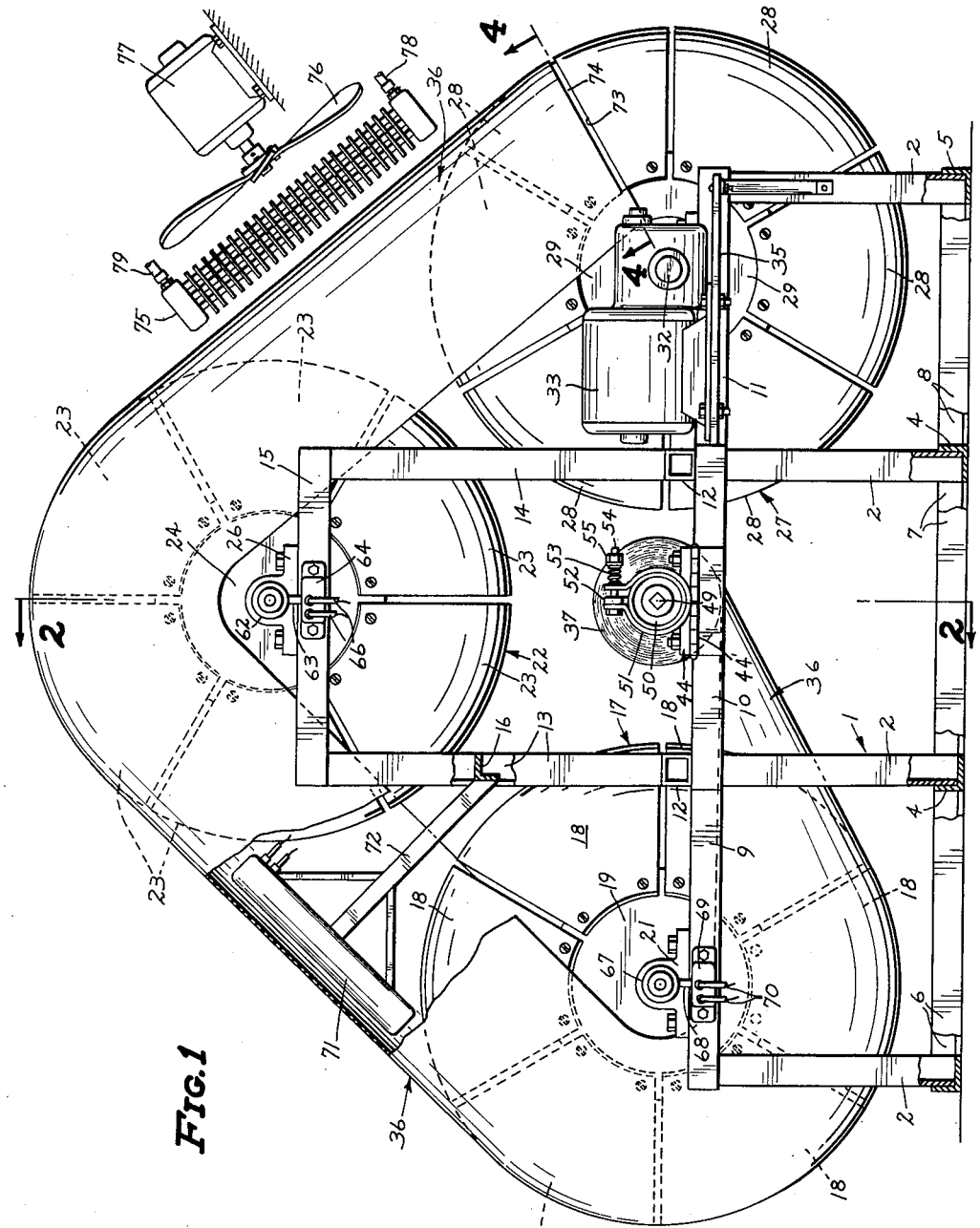
FIG. 1 is a view in side elevation of an apparatus for making tire wrappers, produced in accordance with my invention, some parts being broken away and some parts being shown in section.

In the preferred embodiment of the invention illustrated, a frame structure, illustrated in its entirety by the numeral 1, is preferably made from structural angle iron or the like, and comprises a plurality of upright legs 2 connected at their lower ends by horizontally disposed cross members 3, 4 and 5, and at opposite sides of the supporting structure by longitudinally extending lower rails 6, 7 and 8. At their upper ends, the legs 2 are connected by similar longitudinally extending side rails 9, 10 and 11. The supporting structure 1 further comprises laterally inwardly projecting arms 12 at the inner ends of the side rails 10, to the inner ends of which are welded or otherwise rigidly secured pairs of upstanding upper legs 13 and 14. Each of the legs 13 and 14 of each pair thereof are joined at their upper ends by longitudinally extending horizontal rails 15, and the legs 13, intermediate their ends, are joined by a cross member 16.

A first rotary mold or forming roll 17 comprises a plurality of segmental mold sections 18 rigidly mounted on axially spaced side plates 19 that are fixed on a tubular shaft 20 which in turn is journalled in bearings 21 that are bolted or otherwise secured to the upper side rails 9. A second rotary mold or forming roll 22 likewise comprises a plurality of segmental mold sections 23 that are rigidly secured to axially spaced side plates 24 that are fixed on a tubular shaft 25 which is journalled in suitable bearings 26 rigidly secured to the top side rails 15, the axes of the shafts 20 and 25 being horizontally disposed and parallel. It will be noted that the forming rolls 17 and 22 are substantially in the shape of flattened spheroids, the first forming roll 17 being less flattened than the second forming roll 22. As will hereinafter appear, the first forming roll 17 is utilized to partially form sheet material being entrained thereover, while the second forming roll 22 completes the forming operation. A collector roll 27 is of substantially the same size and shape as the second forming roll 22, and comprises a plurality of segmental sections 28 rigidly secured to side plates 29 that are fixed on a rotary shaft 30 journalled in bearings 31 which are bolted or otherwise rigidly secured to the upper side rails 11. One end of the shaft 30 is secured to a drive shaft 32 of a conventional speed reduction gear-equipped driving motor 33, by means of a conventional coupling element 34. The drive motor 33 is supported on a mounting plate 35 that is welded or otherwise rigidly secured to the frame structure 1.

The sheet material to be formed into tire wrappers, and indicated by the numeral 36, may be of any of the commonly known thermoplastic synthetics, such as polyethylene or the like, and is preferably provided in a roll 37 on a tubular core 38, such as shown in FIG. 2. Means for mounting the roll 37 includes a shaft 39 that is screw threaded at its opposite end portions to receive clamping collars 40 and 41 which securely hold the tubular core 38 in place on the shaft 39. The shaft 39 is further provided with trunnions 42 and 43 that are journalled in respective bearings 44 and 45, the former of which is hingedly mounted on one of the upper side rails 10, as indicated at 44', and the latter of which is bolted or otherwise rigidly secured to the opposite upper side rail 10. The bearing 45 comprises a pair of hinged bearing sections 46 and 47 that are releasably locked together by a wing nut-equipped locking screw 48, whereby to facilitate mounting of a new roll 37 and its tubular core 38 on the shaft 39, and removal of a used core 38 therefrom. The trunnion portion 42 of the shaft 39 is provided at its outer end with a cross-sectionally polygonal end 49 that is contained in a brake drum 50 which is encompassed by a brake band 51 carried by an arm 52 welded or otherwise secured to the bearing 44. The brake band 51 is yieldingly urged into braking engagement with the drum 50 by a coil compression spring 53, adjustment of the yielding bias of the spring 53 being had through a mounting screw 54 that extends through the spring 53, and an adjustment nut 55 screw threaded on the mounting screw 54.

For the purpose of heating the sheet 36 to a moldable state below the melting point of the material of which the sheet 36 is made, I provide heating elements 56 suitably mounted wtihin the forming roll sections 23, see particularly FIG. 2. The heating elements 56 are conventional in nature, being of the electrical resistance type, and preferably arranged so that the outer peripheral or crown portion 57 of the roll 22 is heated to a higher temperature than the opposite sides of the roll adjacent the side plates 24 thereof. With this arrangement, the portion of the sheet 36 engaged by the forming roll 22 is rendered softer adjacent the longitudinal axis of the sheet 36 than at the opposite longitudinal edges thereof. The heating elements 56 are supplied with a current of electricity from a suitable source, not shown, through the medium of leads 58 that extend through the hollow shaft 25 and through an opening 59 therein, to a junction block or the like 60, to which other leads 61 from the heating elements 56, may be attached. The leads 58 are each connected at their outer ends to a different one of a pair of slip rings 62 that are mounted on one end of the shaft 25 and insulated therefrom and from each other. A pair of brushes or the like 63 are suitably mounted on a bracket 64 and may be assumed to be connected to leads 66 which are adapted to be connected to a source of electrical power. While in the drawings only the forming roll 22 is shown as containing the heating elements 56, it may be assumed that the first forming roll 17 is likewise provided with similar heating elements. With reference to FIG. 1, it will be seen that the hollow shaft 20 is provided with slip rings 67, one of which is shown, and cooperating brushes 68 projecting outwardly from a mounting block or the like 69 similar to the block or bracket 64, and having power leads 70 extending therefrom and adapted to be connected to the source of power, not shown. A stationary heating element 71 is disposed intermediate the first and second forming rolls 17 and 22 respectively, and is suported by a mounting bracket or the like 72 that is welded or otherwise rigidly secured to the cross bar 16, see FIGS. 1 and 3. The heating element 71 is in the form of a cross sectionally arcuate shoe, and serves the purpose of maintaining the portion of the sheet 36 adjacent the longitudinal axis thereof at molding temperature during movement of the sheet 36 between the first forming roll 17 and the second roll 22.

One of the collector roll segments 28 is formed to provide an outwardly opening channel or groove 73 that extends generally radially at opposite sides of the section 28 and generally axially across the outer peripheral portion of the section. An outwardly opening locking channel 74, preferably made from resilient metal, conforms to the shape of the channel 73, and is adapted to releasably lock the leading end portion of the elongated plastic sheet 36 therein so that said sheet 36, after forming, may be wound upon the collector roll 27 in its formed condition. To lock the leading end of the sheet 36 in the groove 73, it is only necessary to place said leading end over the groove 73, and press the locking channel 74 radially inwardly into the groove 73 over said leading end of the sheet 26, as indicated in FIGS. 4 and 5.

In forming tire wrappers with the above-described apparatus, a roll 37 of the sheet material 36 is clamped on the shaft 39 and entrained over the forming rolls 17 and 22, the leading end of the sheet 26 being releasably locked in the groove 73 of the collector roll 27. Electrical energy is supplied to the heating elements of the forming rolls 17 and 22 as well as the heating element 71, and the drive motor 33 caused to operate to impart rotation to the collector roll 27. The adjustment nut 55 is manipulated to cause a predetermined drag to be imparted on the supply roll 37 by the brake band 51 operating against the brake drum 50. As the sheet 36 passes over the heated forming rolls 17 and 22, the sheet becomes softened to a formable or moldable state, and the pulling effort of the collector roll 27, combined with the braking effort applied to the supply roll 37, causes the sheet 36 to be stretched adjacent the longitudinal axis thereof, while the opposite longitudinal side edge portions of the sheet 36 remain sustantially in a neutral condition. Further, the softening of the laterally intermediate portion of the sheet 36 causes the same to assume a cross sectionally U-shape whereby to conform closely to the contours of the forming rolls as the sheet moves thereover. Thus, the sheet 36 assumes the form of a longitudinally arcuate, inwardly opening channel. Preferably, the outer surfaces of the forming rolls 17 and 22 are coated with a suitable release agent such as tetrafluorethylene or silicone oil or resin, to prevent the softened sheet from adhering to the forming rolls as it passes thereover.

As the formed sheet 36 leaves the second forming roll 22 and approaches the collector roll 27, the same is cooled to set the molded shape thereof and to prevent each winding thereof on the collector roll 27 from adhering to an underlying winding. Means for cooling the formed sheet 26 is shown more or less diagrammatically in FIG. 1 as comprising a cooling radiator 75 and a cooling fan 76 driven by a motor 77. The radiator 75 is provided at one end with an inlet 78 that is adapted to be connected to a source of cold fluid, and a discharge outlet 79 at its opposite end.

When all of the sheet material 36, or a desired number of windings thereof, have accumulated on the collector roll 27, the motor 33 is deenergized, and suitable cutting means such as a cutting blade 80 is aligned with the channel or groove 73 in the collector roll 27, and caused to cut through all of the layers or windings of the formed material, throughout the length of the groove 73, whereby to provide a plurality of tire wrappers in the form of nested concentric radially inwardly opening channel shaped split rings. These are removed from the collector roll 27 in a nested group and preferably packed for storage or shipping in a suitable container.

The above-described apparatus and its operation are but one example of apparatus and method for producing tire wrappers of the type above-described; and it will be appreciated that wrappers of this type may be produced by other molding means.

In wrapping a tire or tire casing, one of the wrappers is removed from the group thereof, and the tire placed therein. The severed ends of the wrapper are overlapped and heat sealed with the use of a conventional heat-sealing tool, and the opposite inner circumferential edges of the wrapper are inturned so as to overlie the radially inner circumferential surface portions of the tire bead, in over-lapping relationship. The over-lapped edges of the wrapper are then heat sealed to cause the tire to be wholly encased by the wrapper. By utilizing a wrapper of this type, a tire may be wrapped in a minimum of time and with a minimum of effort, resulting in a smooth attractive package. By utilizing transparent sheet material, the tire tread, as well as any other markings thereon is clearly visible to the observer when the tire is displayed for sale. If desired, advertising or sheets of desired printed matter may be interposed between the wrapped tire and the wrapper therefor.

While I have described the wrapper as being intended for use particularly in the covering of tires, it will be appreciated that wrappers of this type may be used with equal facility to cover various other articles or products in annular shape, such as, curing bags used in tire repair, and coils of rope, wire, garden hose, and the like.

While I have shown and described a commercial embodiment of my apparatus for producing wrappers, and a preferred method of making the wrappers with said apparatus, it will be understood that the same is capable of modification without departure from the spirit and scope of the invention, as defined in the claims.

What I claim is:

1. Apparatus for making wrappers for articles of annular shape, said apparatus comprising a support, means mounted in said support including a mold and a sheet feeding means associated therewith for continuously forming an elongated flat sheet of thermoplastic synthetic material into a longitudinally arcuate channel of cross sectionally generally U-shape, means for applying heat to said sheet to convert the same to a softened state below the melting point thereof and during the forming thereof wherein the sheet material is readily mold-formed and retains its formed condition, a collector roll journalled in said support for rotation in a direction to continuously wind up the formed sheet, said collector roll defining an outwardly opening cutting groove for reception of a cutting tool, said groove having portions extending generally radially at axially opposite sides of said collector roll and a connecting portion extending generally axially across the adjacent outer circumferential surface portion thereof, whereby to guide the cutting tool to sever the accumulated layers of formed material wound on said collector roll into nested concentric wrappers which define radially inwardly opening split annular channels, and means for imparting rotation to said collector roll.

2. In an apparatus for making wrappers for articles of annular shape, a supporting structure, means for journalling a supply roll of normally flat thermoplastic synthetic sheet material to be formed, a rotary mold for engagement with said sheet material fed from said supply roll, said mold defining a flattened spheroid journalled on its minor axis in said frame structure, said minor axis being parallel to the axis of rotation of said supply roll journalling means, means for heating said material during passage thereof over said rotary mold to convert said material adjacent the longitudinal axis of the sheet to a softened state below the melting point of said material wherein the portion of said sheet adjacent its longitudinal axis is readily stretched and mold-formed and substantially retained in its stretched and formed condition, whereby said mold forms said sheet continuously into a longitudinally arcuate channel of cross sectionally U-shape, means for cooling said sheet to set the same in its formed condition as it leaves said mold, a collector roll journalled in said frame structure on an axis parallel to the above-mentioned axes, said collector roll being of a shape similar to said mold, means for attaching the leading end of said sheet to said collector roll, means for imparting rotation to said collector roll whereby to draw said sheet from the supply roll circumferentially over said mold and cause the formed material to be wound continuously on said collector roll, and means on said collector roll for guiding a cutting tool in a direction to sever the layers of formed material into nested concentric wrappers which define radially inwardly opening split annular channels.

3. The method of producing wrappers for articles of annular shape, said method comprising, feeding an elongated sheet of thermoplastic synthetic material circumferentially over a forming roll of less axial length than the width of said sheet, heating said forming roll to a temperature sufficient to convert the area of said sheet adjacent the longitudinal axis thereof to a softened state below the melting point thereof, wherein the sheet material is readily mold-formed and retains its mold-formed condition, to cause said sheet to be curved longitudinally and to assume a cross-sectionally U-shape, continuously cooling the sheet thus formed as said sheet moves out of engagement with said forming roll, winding the formed sheet on a collector roll, and thereafter cutting through all of the wound layers of said sheet on said collector roll in radially and generally axial directions, whereby to produce a plurality of radially inwardly opening longitudinally arcuate channels having the opposite ends thereof in substantially abutting relationship.

4. Apparatus for making wrappers for articles of annular shape, said apparatus comprising, means including a mold for forming an elongated sheet of thermoplastic synthetic material into a longitudinally arcuate radially inwardly opening channel of cross sectionally U-shape, said mold defining a flattened spheroid journalled for rotation on its minor axis and comprising a plurality of segmental mold sections cooperating to define a chamber, said sheet being carried circumferentially over said mold during rotation thereof, means for applying heat to said sheet during the forming thereof to convert the same to a softened condition wherein it is readily mold-formed and will substantially retain its mold-formed condition, said last-mentioned means including a heating element mounted in said chamber, means for cooling the sheet to set the same in its formed condition, a collector roll for receiving the formed and cooled sheet from said mold and supporting the same in its formed condition, and means on said collector roll for guiding a cutting tool in a direction to sever layers of the formed sheet wound on said collector roll into nested concentric wrappers which define radially inwardly opening split annular channels.

5. In an apparatus for making wrappers for articles of annular shape, a supporting structure, means for journalling a supply roll of normally flat thermoplastic synthetic sheet material to be formed, a rotary mold for engagement with said sheet material fed from said supply roll, said mold defining a flattened spheroid journalled on its minor axis in said frame structure, said minor axis being parrallel to the axis of rotation of said supply roll journalling means, means for heating said material during passage thereof over said rotary mold to convert said material adjacent the longitudinal axis of the sheet to a softened state below the melting point of said material wherein the portion of said sheet adjacent its longitudinal axis is readily stretched and mold-formed and substantially retained in its stretched and formed condition, whereby said mold forms said sheet continuously into a longitudinally arcuate channel of cross sectionally U-shape, means for cooling said sheet to set the same in its formed condition as it leaves said mold, a collector roll journalled in said frame structure on an axis parallel to the above-mentioned axes, said collector roll being of a shape similar to said mold, means for attaching the leading end of said sheet to said collector roll, and means for imparting rotation to said collector roll whereby to draw said sheet from the supply roll circumferentially over said mold and cause the formed material to be wound on said collector roll, said collector roll defining an upwardly opening cutting groove for reception of a cutting tool, said groove having portions extending generally radially at axially opposite sides of said collector roll and a connecting portion extending generally axially across the adjacent outer circumferential surface portion thereof, whereby to guide a cutting tool to sever the accumulated layers of formed material wound on said collector roll into nested concentric wrappers which define radially inwardly opening split annular channels.

References Cited in the file of this patent
UNITED STATES PATENTS
1,606,271   Stratford _____ Nov. 9, 1926
(Other references on following page)

UNITED STATES PATENTS

| | | | |
|---|---|---|---|
| 2,260,517 | Hamilton | Oct. 28, | 1941 |
| 2,311,755 | Hutchinson et al. | Feb. 23, | 1943 |
| 2,319,099 | Abramson et al. | May 11, | 1943 |
| 2,323,862 | Zimmerman et al. | July 6, | 1943 |
| 2,560,038 | Trainer | July 10, | 1951 |
| 2,674,764 | Eaby et al. | Apr. 13, | 1954 |
| 2,749,572 | Nowak | June 12, | 1956 |

FOREIGN PATENTS

| | | | |
|---|---|---|---|
| 200,129 | Australia | Nov. 2, | 1955 |